(12) United States Patent
Liu et al.

(10) Patent No.: US 7,629,071 B2
(45) Date of Patent: Dec. 8, 2009

(54) GAS DIFFUSION ELECTRODE AND METHOD OF MAKING THE SAME

(75) Inventors: Han Liu, Waltham, MA (US); Robert C. McDonald, Stow, MA (US); Thomas J. McCallum, Ashland, MA (US); Anthony B. LaConti, Lynnfield, MA (US); John Forchione, Ashland, MA (US); Jeanette O'Hara, Honeoye, NY (US); Joerg Roth, Trebur (DE)

(73) Assignee: Giner Electrochemical Systems, LLC, Newton, MA (US)

( * ) Notice: Subject to any disclaimer, the term of this patent is extended or adjusted under 35 U.S.C. 154(b) by 0 days.

(21) Appl. No.: 11/017,527

(22) Filed: Dec. 20, 2004

(65) Prior Publication Data

US 2006/0078784 A1 Apr. 13, 2006

(51) Int. Cl.
*H01M 4/86* (2006.01)
*C01B 11/04* (2006.01)

(52) U.S. Cl. .............................. 429/40; 429/42; 429/44; 428/408; 428/316.6; 428/311.11

(58) Field of Classification Search .................. 429/209, 429/232, 235, 237, 241, 40, 44, 42; 428/316.6, 428/317.9, 408, 311.11
See application file for complete search history.

(56) References Cited

U.S. PATENT DOCUMENTS

| | | | |
|---|---|---|---|
| 4,851,304 A | 7/1989 | Miwa et al. | |
| 4,885,217 A | 12/1989 | Hoge | |
| 5,242,765 A | 9/1993 | Naimer et al. | |
| 5,595,801 A | 1/1997 | Fahy et al. | |
| 5,998,057 A * | 12/1999 | Koschany et al. | 429/42 |
| 6,010,606 A | 1/2000 | Denton et al. | |
| 6,099,965 A * | 8/2000 | Tennent et al. | 428/408 |
| 6,103,077 A | 8/2000 | DeMarinis et al. | |
| 6,110,417 A * | 8/2000 | Sugikawa | 419/2 |
| 6,451,470 B1 | 9/2002 | Koschany et al. | |
| 6,666,961 B1 * | 12/2003 | Skoczylas et al. | 204/242 |
| 6,713,034 B2 | 3/2004 | Nakamura et al. | |
| 7,455,925 B2 * | 11/2008 | McLean et al. | 429/35 |
| 2003/0134179 A1 * | 7/2003 | Gascoyne et al. | |
| 2004/0045816 A1 * | 3/2004 | Masel et al. | |

FOREIGN PATENT DOCUMENTS

WO WO 01/56103 A1 8/2001

* cited by examiner

*Primary Examiner*—Hai Vo
(74) *Attorney, Agent, or Firm*—Kriegsman & Kriegsman

(57) ABSTRACT

A gas diffusion electrode and method of making the same. According to one embodiment, the electrode comprises a support layer, a first cushioning layer positioned on top of the support layer, a second cushioning layer positioned on top of the first cushioning layer, and a catalyst layer positioned on top of the second cushioning layer. The support layer is a mechanically stable, electrically-conductive, gas porous substrate, such as carbon fiber paper. The first cushioning layer, which is also gas porous, comprises a non-woven mat of electrically-conductive, chemically-inert fibers, preferably carbon nanofibers, bound together with a polymeric binder, such as polytetrafluoroethylene. The second cushioning layer is similar to the first cushioning layer, except that carbon black or a similar electrically-conductive, chemically-inert particulate material is included in addition to or instead of the fibrous material for the purpose of fine-tuning pore size.

15 Claims, 5 Drawing Sheets

Active Area: 50 cm$^2$, MEA: Gore 25 μm PRIMEA 5510 w/0.4 mg Pt/cm$^2$,
Gas: H$_2$/Air, Pressure: 25 psi, T$_{anode}$=T$_{cathode}$=T$_{cell}$=60°C, Stoic = 2

GAS DIFFUSION ELECTRODE AND METHOD OF MAKING THE SAME

BACKGROUND OF THE INVENTION

The present invention relates generally to gas diffusion electrodes of the type used in electrochemical devices containing a solid polymer electrolyte membrane and relates more particularly to a novel gas diffusion electrode of the aforementioned type and to a method of manufacturing the same.

Electrochemical devices of the type comprising a solid polymer electrolyte membrane (PEM) are well-known, such electrochemical devices finding applications as, for example, fuel cells, electrolyzers, sensors, gas concentrators, gas compressors, supercapacitors, ultracapacitors and industrial electrochemical process units. A common type of solid polymer electrolyte membrane that is used in electrochemical devices consists of a homogeneous perfluorosulfonic acid (PFSA) polymer, said PFSA polymer being formed by the copolymerization of tetrafluoroethylene and perfluorovinylether sulfonic acid. See e.g., U.S. Pat. No. 3,282,875, inventors Connolly et al., issued Nov. 1, 1966; U.S. Pat. No. 4,470,889, inventors Ezzell et al., issued Sep. 11, 1984; U.S. Pat. No. 4,478,695, inventors Ezzell et al., issued Oct. 23, 1984; U.S. Pat. No. 6,492,431, inventor Cisar, issued Dec. 10, 2002, all of which are incorporated herein by reference. A commercial embodiment of a perfluorosulfonic acid polymer PEM is available from DuPont (Wilmington, Del.) as NAFION® PFSA polymer.

Typically, the solid polymer electrolyte membrane is sandwiched between a pair of electrodes at the membrane interfaces on which desired electrochemical reactions take place, one of the electrodes functioning as an anode and the other of the electrodes functioning as a cathode. A first catalyst layer is typically positioned between the anode and the membrane, and a second catalyst layer is typically positioned between the cathode and the membrane, the catalyst layers either being formed as part of the electrodes or being applied to the solid polymer electrolyte membrane. The combination of the membrane, the catalysts and the electrodes is commonly referred to in the art as a membrane electrode assembly (MEA).

Where the electrochemical device is used, for example, to generate electricity, a fuel, such as hydrogen, is supplied to the anode, and an oxidizing agent, such as oxygen or air, is supplied to the cathode. At the anode catalyst layer, the fuel is oxidized, thereby forming cations and free electrons. At the cathode catalyst layer, the oxidizing agent is reduced by taking up electrons. The cations formed at the anode catalyst layer migrate through the membrane to the cathode and react with the reduced oxidizing agent. In this manner, where hydrogen is used as the fuel and oxygen is used as the oxidizing agent, water is formed at the cathode.

As can be appreciated, the electrodes serve a variety of purposes including discharging the current produced at the catalysts to neighboring current collectors and allowing the reaction gases to diffuse through the electrodes to the catalysts. In addition, the cathode desirably prevents water formed during the reaction from flooding the cathodic catalyst since such flooding prevents reaction gases from reaching the cathodic catalyst. Therefore, the electrodes must be electrically conductive, must have sufficient gas diffusion capacity for the reaction gases to reach the catalysts and, at least in the case of the cathode, must have sufficient hydrophobicity, at least in regions facing the membrane, to prevent water formed during the reaction from flooding the cathodic catalyst. The electrodes also provide structural support to the membrane, particularly where the membrane is made thin (to minimize resistance thereacross) and has little inherent rigidity.

One common type of material used as a gas diffusion electrode is carbon fiber paper. (Carbon fiber cloths, perforated metal sheets, sintered metal particle sheets, and metal meshes are other types of media also commonly used as gas diffusion electrodes.) Carbon fiber paper is a random or nonwoven mat of carbon fibers. Typically, carbon fiber paper is made by preparing a slurry in water of dispersed polyacrylonitrile carbon fibers and a phenolic binder; spreading the slurry out to a desired thickness; and then heating the slurry at a sufficiently high temperature for a sufficient duration to carbonize the fibers and binder. Examples of carbon fiber paper gas diffusion electrodes are disclosed in the following U.S. patents, both of which are incorporated herein by reference: U.S. Pat. No. 4,851,304, inventors Miwa et al., which issued Jul. 25, 1989; and U.S. Pat. No. 6,713,034, inventors Nakamura et al., which issued Mar. 30, 2004.

One shortcoming that the present inventors have noted in connection with the above-described gas diffusion electrodes is that there is a tendency for such electrodes, due to rigid microscopic irregularities therein, to puncture the adjacent polymer electrolyte membrane, causing electrical shorting of the electrochemical device.

Another shortcoming that the present inventors have noted in connection with the above-described gas diffusion electrodes is that there is a tendency for such electrodes, even in the case of hydrophobized carbon paper, to become flooded at the cathode catalyst when humidification is high or reactant flow is low.

Other documents of interest include the following, all of which are incorporated herein by reference: U.S. Pat. No. 6,010,606, inventors Denton et al., which issued Jan. 4, 2000; U.S. Pat. No. 6,103,077, inventors DeMarinis et al., which issued Aug. 15, 2000; and U.S. Pat. No. 6,451,470, inventors Koschany et al., which issued Sep. 17, 2002.

SUMMARY OF THE INVENTION

It is an object of the present invention to provide a novel gas diffusion electrode of the type that is well-suited for use in electrochemical devices containing a solid polymer electrolyte membrane.

It is another object of the present invention to provide a gas diffusion electrode of the type described above that overcomes at least some of the drawbacks discussed above in connection with existing gas diffusion electrodes.

Therefore, according to one aspect of the invention, there is provided a gas diffusion electrode comprising (a) a supporting layer, said supporting layer being an electrically-conductive, porous structure; and (b) a first cushioning layer coupled to said supporting layer, said first cushioning layer being an electrically-conductive, porous structure comprising a nonwoven mat of electrically-conductive fibers bound together with a polymeric binder.

In a first preferred embodiment, the supporting layer is carbon fiber paper, and the first cushioning layer is in direct contact with an exposed surface of the carbon fiber paper, the first cushioning layer having a pore size of about 0.01 to 50 microns and a thickness of about 0.1 to 500 microns and comprising a nonwoven mat of carbon nanofibers bound together with a polymeric binder, such as polytetrafluoroethylene. A catalyst layer may additionally be formed on the exposed surface of the first cushioning layer.

In a second preferred embodiment, the gas diffusion electrode further comprises a second cushioning layer, the second cushioning layer being an electrically-conductive porous structure in direct contact with the exposed surface of the first cushioning layer. The second cushioning layer is similar to the first cushioning layer, except that the carbon nanofibers of the first cushioning layer are replaced with carbon black or a combination of carbon nanofibers and carbon black in the second cushioning layer. The use of carbon black in the second cushioning layer permits one to adjust the porosity of the second cushioning layer. Metal particles or supported metal particles may be used instead of carbon black in the second cushioning layer.

The present invention is also directed to a method of making a gas diffusion electrode, said method comprising the steps of (a) providing a supporting layer, said supporting layer being an electrically-conductive, porous structure having an exposed surface; (b) mixing carbon nanofibers with at least one diluent and at least one polymeric binder to form a first suspension of generally uniform composition; (c) depositing the first suspension on the exposed surface of the supporting layer to form a first coating; (d) drying the first coating; and (e) then, sintering the first coating.

The present invention is also directed to membrane electrode assemblies incorporating the above-described gas diffusion electrode and to electrochemical devices incorporating the above-described gas diffusion electrode, such electrochemical devices including, but not being limited to, fuel cells, electrolyzers, gas concentrators, gas compressors, sensors, supercapacitors, ultracapacitors, and industrial electrochemical process units.

For purposes of the present specification and claims, it is to be understood that certain relational terms used herein, such as "above," "below," "top," "bottom," "over," "under," "in front of," or "behind," when used to denote the relative positions of two or more parts of an electrochemical device or a component thereof, are used to denote such relative positions in a particular orientation and that, in a different orientation, the relationship of said components may be reversed or otherwise altered.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
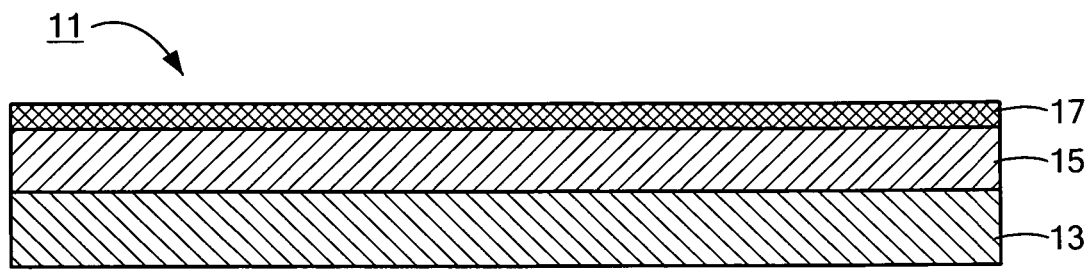
FIG. 1 is a schematic section view of a first embodiment of a gas diffusion electrode constructed according to the teachings of the present invention.

Referring now to FIG. 1, there is shown a schematic section view of a first embodiment of a gas diffusion electrode constructed according to the teachings of the present invention, said gas diffusion electrode being represented generally by reference numeral 11.

Electrode 11 comprises a support layer 13, a cushioning layer 15 and a catalyst layer 17.

Support layer 13 is a mechanically stable, electrically-conductive, chemically-inert, porous substrate. Preferably, the area resistivity of support layer 13 is less than 10 m$\Omega \cdot cm^2$. Materials suitable for use as support layer 13 include conventional gas diffusion electrode materials, such as, but not limited to, carbon fiber papers, carbon cloths, metal meshes, metal-coated polymer meshes, perforated metal sheets and sintered metal particle sheets. Support layer 13 may be coated, partially coated or impregnated with carbon, metallic, metal oxide or polymeric substances (e.g., fibers or particles) to enhance its electrical properties and/or to modify its hydrophobicity.

Cushioning layer 15, which is positioned directly on top of support layer 13, is an electrically-conductive, chemically-inert, porous structure, preferably having a pore size of about 0.01 to 50 microns and a thickness of about 0.1 to 500 microns, more preferably about 1 to 100 microns. Cushioning layer 15 includes a non-woven mat of entangled fibers bound together with a suitable polymeric binder. Preferably, the entangled fibers used in forming cushioning layer 15 have a diameter of less than 1 micron, more preferably less than 200 nm, and have a length of about 0.1 to 100 microns, more preferably 30 to 100 microns. Examples of fibrous materials that may be suitable for use in forming cushioning layer 15 include carbon fibers, electrically-conductive polymeric fibers, and metal or metal oxide fibers, with carbon nanofibers (such as PYROGRAF III® nanofibers, which are commercially available from Applied Sciences, Inc., Cedarville, Ohio) being preferred. Examples of polymeric binders that may be suitable for use in forming cushioning layer 15 include perfluorinated polymers (such as TEFLON® polytetrafluoroethylene (PTFE) or fluorinated ethylene propylene (FEP), both of which are commercially available from DuPont, Wilmington, Del.), sulfonated perfluorinated polymers (such as NAFION® perfluorosulfonic acid, which is commercially available from DuPont, Wilmington, Del.), polyolefins, polyether ketones, polyether sulfones, polysulfones, polybenzimidazoles, polyphenylene sulfides, polyimide, polyamide, polyphenylene oxide, or the ionic equivalents of the above polymers including sulfonated or phosphornated derivatives of these polymers.

To form cushioning layer 15, the carbon nanofibers or other fibrous materials used are first dispersed by mechanical agitation in a solvent. The mechanical agitation may be, for example, ultrasonification, high shear rate stirring or ball milling. The solvent may be water, one or more alcohols, one or more organic solvents, or a mixture thereof. Water is a preferred solvent due to its minimal environmental impact. Where the fibers are carbon nanofibers and water is used as the solvent, the addition of one or more alcohols, such as methanol, ethanol, isopropanol or mixtures thereof, is desirable as the alcohols facilitate the wetting of the fibers. The total concentration of alcohol in such a system is preferably about 5 to 80%, more preferably about 10 to 40%.

The polymeric binder, which may be in the form of particles, fibers or a suspension, may be added to the fiber/solvent mixture either before or after the above-noted mechanical agitation. To tailor the properties of cushioning layer 15 to a particular application, a mixture or blend of polymeric binders may be used. The selection of solvents and polymeric binders may be such that some of the polymeric binders are dissolved in the solvent and others of the polymeric binders are not dissolved in the solvent. It is thus possible to prepare a cushioning layer comprising carbon nanofibers and polymeric fillers bonded by another polymer or polymer mixture/blend. It is exceptionally advantageous to have such a versatile structure so that the electrical properties, pore size distribution, mechanical properties and hydrophobicity can be easily modified.

After mixing the fibers, polymeric binders and solvents to a uniform suspension, the suspension may be applied to the top surface of supporting layer 13 by various coating techniques including, but not limited to, spraying, slot die coating, roll coating, gravure coating, immersion (dip) coating, metering rod (Meyer bar) coating or curtain coating. The choice of coating method depends on the viscosity of the suspension, the coating thickness, and the rigidity of supporting layer 13. Spraying, immersion coating and curtain coating are preferable for low viscosity suspensions used to form a thin cushioning layer 15 whereas slot die coating is particularly suitable for viscous slurries used to form a thicker cushioning layer 15. After coating, the structure may be calendared using two rolling cylinders with a metered gap.

Once coated onto supporting layer 13, cushioning layer 15 may then be dried in air or, optionally, in an inert atmosphere. A regular convection oven may be employed for a batch process whereas infrared light arrays are more suitable for continuous manufacturing. The drying temperature will be dependent on the solvents and polymer binders in the suspension. Generally, the temperature should be set at close to the boiling point of the solvents to maximize the speed of preparation. Depending on suspension formulation, a lower temperature may be necessary to prevent formation of surface defects during the drying process.

An alternative way to prepare cushioning layer 15, which enhances the cushioning effect without sacrificing performance, is by the technique of phase-inversion membrane formation. According to the phase-inversion technique, the electrode is passed through a bath with a non-solvent liquid of the polymer. The non-solvent liquid is selected so that it is mixable with the solvent of the polymer. Compared to a thermal drying process, a more porous structure is usually obtained by phase-inversion membrane formation due to the fact that the solidification of the polymer binder occurs so rapidly that the structure of the matrix is set before it can rearrange into a dense structure. The pore size of the cushioning barrier obtained from such process is larger than the pores formed by the entanglements of the carbon nanofibers. Additionally, the cushioning layer prepared in this fashion has an anisotropic pore size distribution, where a thin surface skin layer with a thickness <2 µm has a porosity less than the bulk of the cushioning layer.

After the application of cushioning layer 15 to supporting layer 13 and the drying of cushioning layer 15, a sintering process is performed. The purpose of sintering is to provide an intimate bonding between the nanofibers and the polymer binder. The sintering temperature is usually chosen to be at least higher than the glass transition temperature of the polymer binder, preferably higher than the melting point of the polymer binder. Consequently, if PTFE is used as the polymer binder, a sintering temperature of 360° C. is preferably chosen. In a manner similar to the drying process described above, a convection oven is used for batch process sintering whereas an array of infrared lamps are preferably used for a continuous process sintering. An inert atmosphere protection may be adopted, if necessary.

Catalyst layer 17, which is positioned directly on top of cushioning layer 15, is a layer comprising a catalytically-active species, such as carbon, noble metals (Pt, Pd, Ru, Ir, Os, Au and Ag), transition metals in groups IVB, VB, VIB, VIII, IB or IIB, corresponding metal oxides, or a combination or alloy thereof. Preferably, one of the metals is Pt or an alloy thereof. The catalytically-active species may be in the form of finely dispersed unsupported particles, such as nanoparticles, or in the form of small particles, such as nanoparticles, deposited on a high-surface-area carbonaceous material, metal, metal oxide or carbide, or silicone oxide particles or fibers.

To form catalytic layer 17, the catalytic materials described above may be mixed with water, organic solvents or a combination thereof, and then printed onto the top (i.e., exposed) surface of cushioning layer 15. Preferably, the catalytic material is dispersed in a water/isopropanol mixture, with the water/isopropanol ratio ranging from about 5 to 95%, preferably from about 50 to 90%. An ion-conducting polymer in solution, suspension or particle form may be added to the mixture to enhance the ionic pathway from the solid polymer electrolyte membrane to the catalyst materials. Generally, the ion-conducting polymer in the catalyst layer should have a similar chemical structure to the solid polymer electrolyte membrane employed in the electrochemical device. Therefore, when using NAFION® or FLEMION® (Asahi Glass, Tokyo, JP) PFSA membranes, it is advisable to use as the ion-conducting polymer solutions containing dissolved or finely dispersed PFSA.

Instead of directly printing catalytic layer 17 onto cushioning layer 15, one could apply catalytic layer 17 to cushioning layer by the conventional decal transfer method.

It should be understood that, instead of including catalytic layer 17 in electrode 11, one could apply catalytic layer 17 to the solid polymer electrolyte membrane or could omit catalytic layer 17 entirely.

Figure 2:
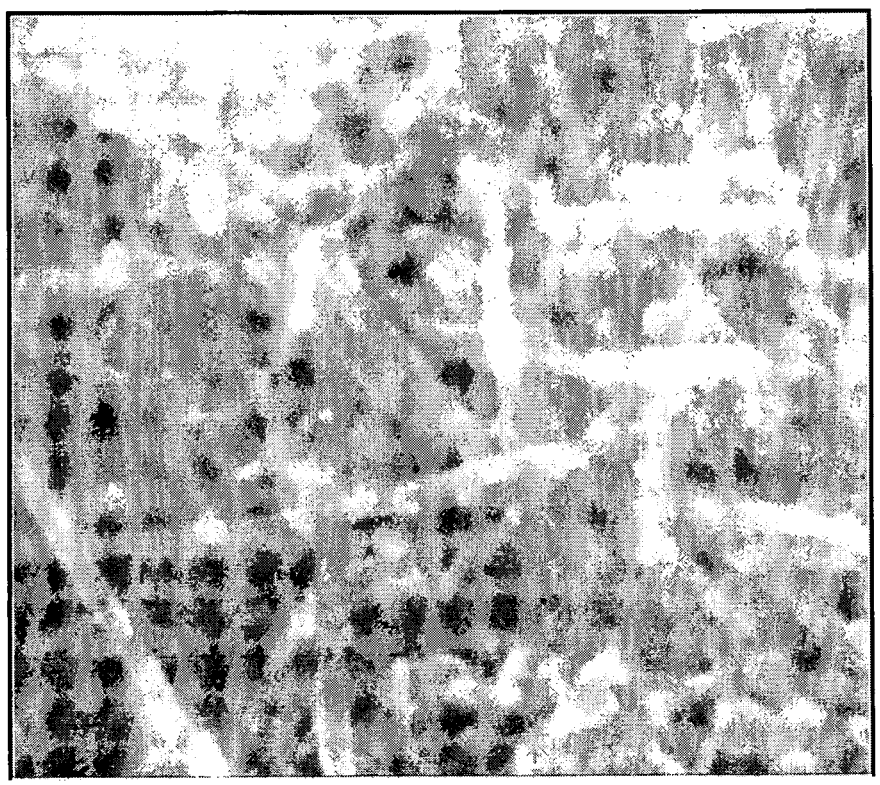
FIG. 2 is a scanning electron micrograph of the cushioning layer of FIG. 1.

Referring now to FIG. 2, there is shown a scanning electron micrograph of a cushioning layer formed in the above-described manner using carbon nanofibers and polytetrafluoroethylene (PTFE). The entanglement of the carbon nanofibers, which is clearly evident in the photo, is the principal reason for the desirable mechanical properties, such as excellent cushioning, of the cushioning layer.

Figure 3:
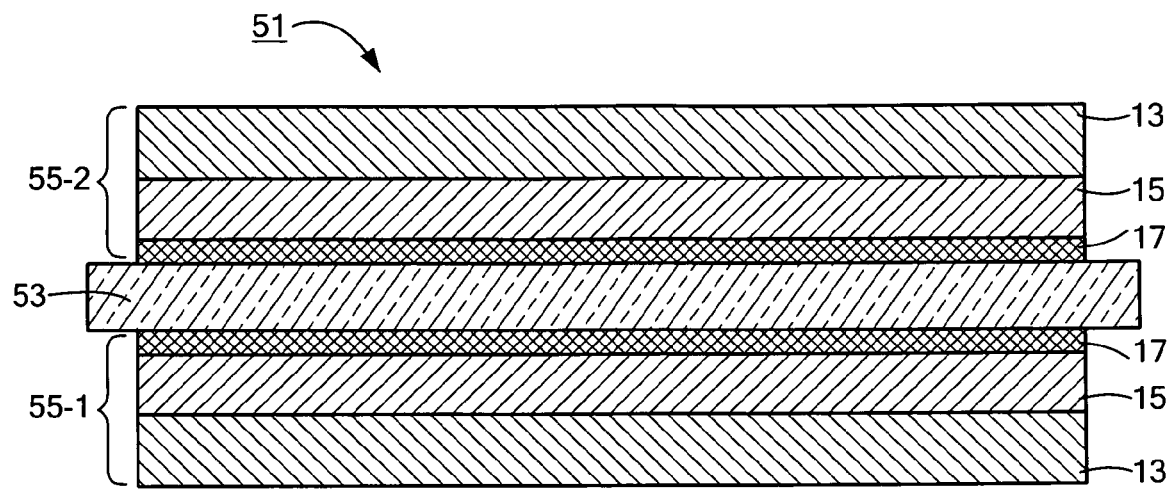
FIG. 3 is a schematic section view of a first embodiment of a membrane electrode assembly constructed according to the teachings of the present invention, the membrane electrode assembly comprising a pair of gas diffusion electrodes identical to the gas diffusion electrode of FIG. 1.

Referring now to FIG. 3, there is shown a schematic section view of a first embodiment of a membrane electrode assembly constructed according to the teachings of the present invention, the membrane electrode assembly being represented generally by reference numeral 51.

Membrane electrode assembly 51 comprises a solid polymer electrolyte membrane 53 and a pair of gas diffusion electrodes 55-1 and 55-2.

Membrane 53 may be a conventional solid polymer electrolyte membrane, such as a NAFION® PFSA membrane. Electrodes 55-1 and 55-2, which are identical to electrode 11, are secured to opposing surfaces of membrane 53, preferably using heat and pressure.

Assembly 51 may be used in the same fashion as conventional membrane electrode assemblies. One advantage of assembly 51 over conventional membrane electrode assemblies is that the entangled structure of the respective cushioning layers 15 of electrodes 55-1 and 55-2 reduces the tendency of microscopic irregularities in the respective supporting layers 13 of electrodes 55-1 and 55-2 from puncturing membrane 53. Another advantage of assembly 51 over conventional membrane electrode assemblies is that the pores of the cushioning layers 15 are smaller than the pores of the supporting layers 13; consequently, there is a lesser tendency for the cathode catalyst to become flooded with water.

Figure 4:
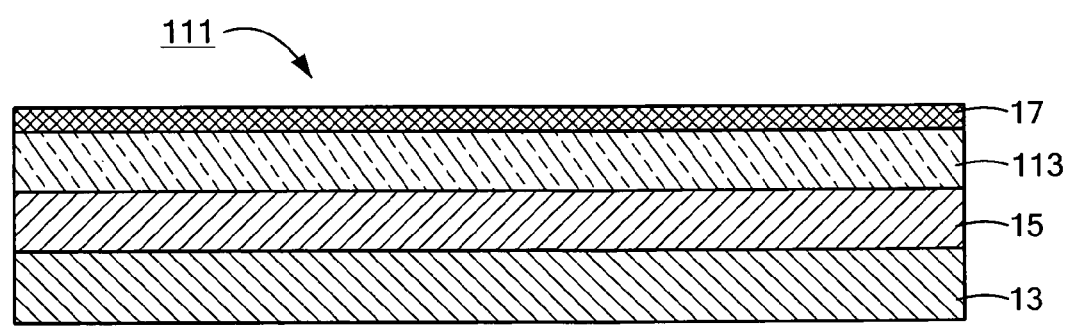
FIG. 4 is a schematic section view of a second embodiment of a gas diffusion electrode constructed according to the teachings of the present invention.

Referring now to FIG. 4, there is shown a schematic section view of a second embodiment of a gas diffusion electrode constructed according to the teachings of the present invention, said gas diffusion electrode being represented generally by reference numeral 111.

Electrode 111 is similar in most respects to electrode 11, the principal difference between the two electrodes being that electrode 111 additionally includes a second cushioning layer 113 positioned between cushioning layer 15 and catalyst layer 17.

Second cushioning layer 113 is similar to cushioning layer 15, the principal difference between the two cushioning layers being that, in cushioning layer 113, the electrically-conductive fibers of layer 15 are replaced with electrically-conductive particles or a combination of electrically-conductive fibers and electrically-conductive particles. Examples of suitable electrically-conductive particles include carbon black, metal particles and supported metal particles. Other particles, fibers and/or fillers may also be present in cushioning layer 113. The thickness of layer 113 is comparable to that for layer 15.

One advantage of electrode 111 over electrode 11 is that one may achieve a desired pore size by adjusting the relative amounts of carbon black (and/or other particulate matter) and fibers. For example, where carbon nanofibers are used, the mass ratio of carbon nanofibers to other additives preferably ranges from about 1 to 100%, more preferably 20 to 80%.

It should be understood that, although cushioning layers 113 and 15 are shown and described herein as physically and compositionally discrete from one another, there may be some penetration of the particulates of cushioning layer 113 into cushioning layer 15. In like fashion, although cushioning layer 15 and supporting layer 13 are shown and described herein as physically and compositionally discrete from one another, there may be some penetration of cushioning layer 15 into supporting layer 13.

In large-scale electrochemical devices, such as in a fuel cell stack, the composition of the reactants and the carrier changes from the inlet to the outlet. Consequently, it is desirable to be able to alter the properties of the one or more cushioning layers so that they can be optimized for a given composition of the reactants. This may be achieved by coating supporting layer 13 in sections, where each section is coated for a certain reactant composition. As a result, the properties of the electrode vary in an in-plane direction that is parallel to the flow direction of the reactant.

Figure 5:
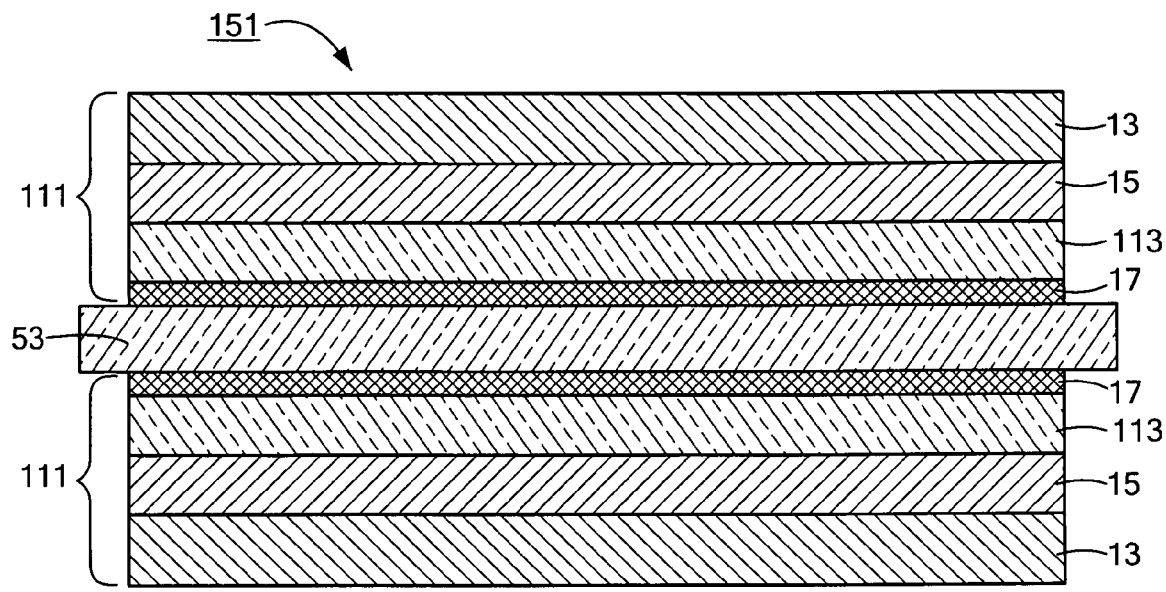
FIG. 5 is a schematic section view of a second embodiment of a membrane electrode assembly constructed according to the teachings of the present invention, the membrane electrode assembly comprising a pair of gas diffusion electrodes identical to the gas diffusion electrode of FIG. 4.

Referring now to FIG. 5, there is shown a schematic section view of a second embodiment of a membrane electrode assembly constructed according to the teachings of the present invention, the membrane electrode assembly being represented by reference numeral 151.

Membrane electrode assembly 151 is similar in most respects to assembly 51, the only difference between the two assemblies being that electrodes 11 in assembly 51 are replaced with electrodes 111 in assembly 151.

Figure 6:
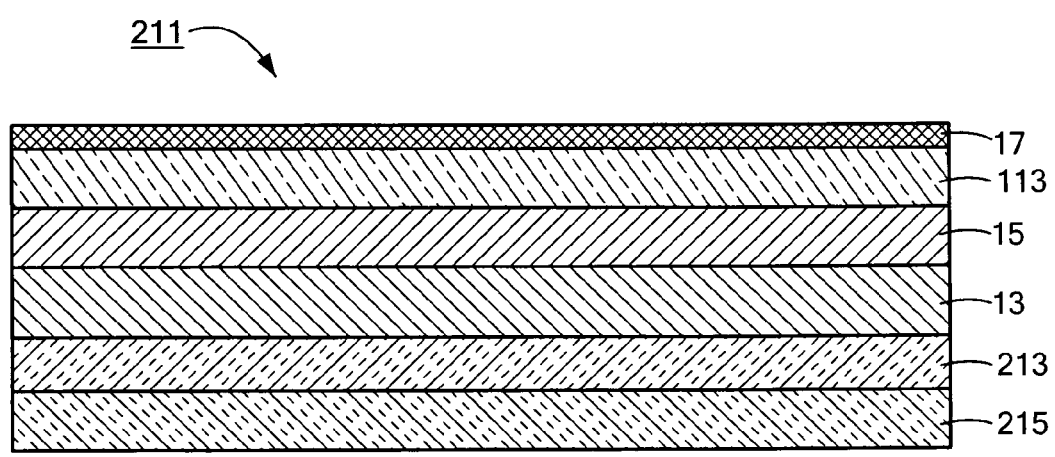
FIG. 6 is a schematic section view of a third embodiment of a gas diffusion electrode constructed according to the teachings of the present invention.

Referring now to FIG. 6, there is shown a schematic section view of a third embodiment of a gas diffusion electrode constructed according to the teachings of the present invention, the gas diffusion electrode being represented generally by reference numeral 211.

Electrode 211 is similar in most respects to electrode 111, the principal difference between the two electrodes being that electrode 211 further includes third and fourth cushioning layers 213 and 215, respectively. Third cushioning layer 213, which is positioned directly under supporting layer 13, is identical in structure and composition to cushioning layer 15. Fourth cushioning layer 215, which is positioned directly under third cushioning layer 213, is identical in structure and composition to cushioning layer 113.

One advantage of electrode 211 over electrode 111 is that electrode 211 is better able to retain moisture therein, which is beneficial for maintaining the conductivity of an adjacent polymer electrolyte membrane.

Figure 7:
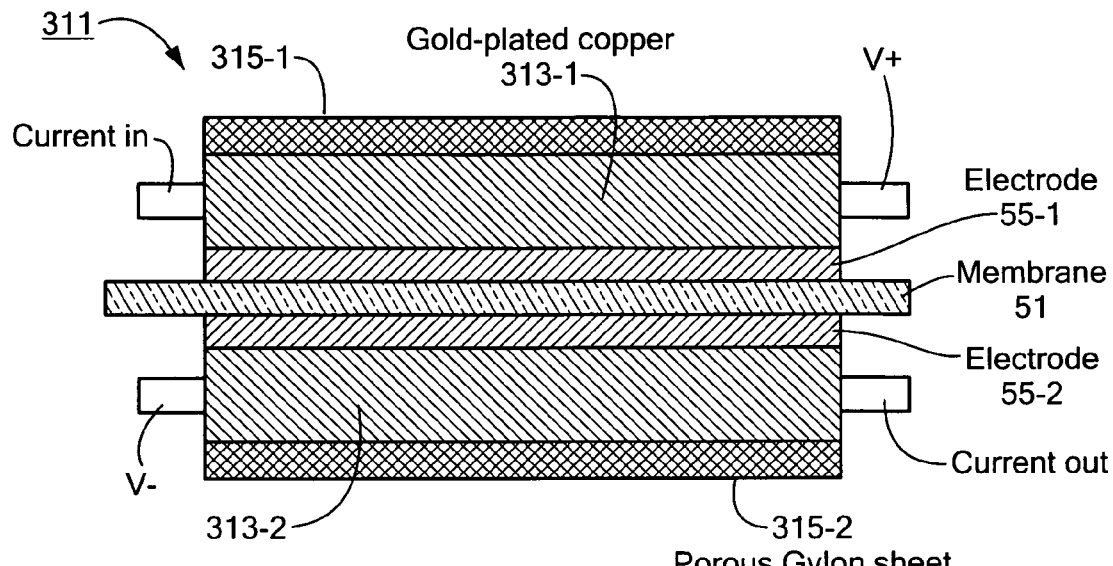
FIG. 7 is a schematic view of an experimental set-up that was used to evaluate the effect of a cushioning layer of the present invention in preventing a supporting layer from puncturing a solid polymer electrolyte membrane.

Referring now to FIG. 7, there is schematically shown an experimental set-up that was used by the present inventors to evaluate the effect of a cushioning layer of the present invention in preventing a supporting layer from puncturing a solid polymer electrolyte membrane, the experimental set-up being represented generally by reference numeral 311.

Set-up 311 includes a pair of gold-plated copper current collectors 313-1 and 313-2, current collectors 313-1 and 313-2 each having a geometric contact area of 1 square inch and being positioned on the opposing exposed surfaces of a membrane electrode assembly 51. A pair of thin GYLON® PTFE (Garlock Sealing Technologies, LLC, Palmyra, N.Y.) films 315-1 and 315-2 were positioned against the exposed surfaces of current collectors 313-1 and 313-2, respectively, films 315-1 and 315-2 each having an uncompressed thickness of 0.065 inch. A hydraulic press (not shown) was placed against the exposed surfaces of films 315-1 and 315-2. Prior to any tests, the hydraulic press was calibrated with pressure sensitive Prescale paper from Fuji Film to ensure balanced compression on the membrane. A force was then applied to set-up 311, increasing stepwise from 100 to 2000 psi in 100-psi increments. For each step, the force was kept steady for 30 seconds before being increased to the next step. DC resistance between current collectors 313-1 and 313-2 was continuously monitored throughout the test. If a puncture occurred, the resistance between the two current collectors dropped from >10 kΩ to 50-200 Ω. The test was then performed again, with electrodes 55-1 and 55-2 being replaced first by a pair of Etek Elat® electrodes (Etek, Inc., Somerset, N.J.) and then by a pair of Johnson Matthey Plain HO60 electrodes (Johnson Matthey Plc, London, UK). The test results are expressed in Table I as number of punctures per number of tests.

TABLE I

| Sample Description | Punctures |
|---|---|
| Cushioned Electrode | 0/4 |
| Etek Elat ® Electrode | 3/4 |

Johnson Matthey Plain HO60 Electrode 4/4

As can be seen, the cushioning layer of the present invention substantially reduced the number of punctures of the membrane by the supporting layer of the electrode.

Figure 8:
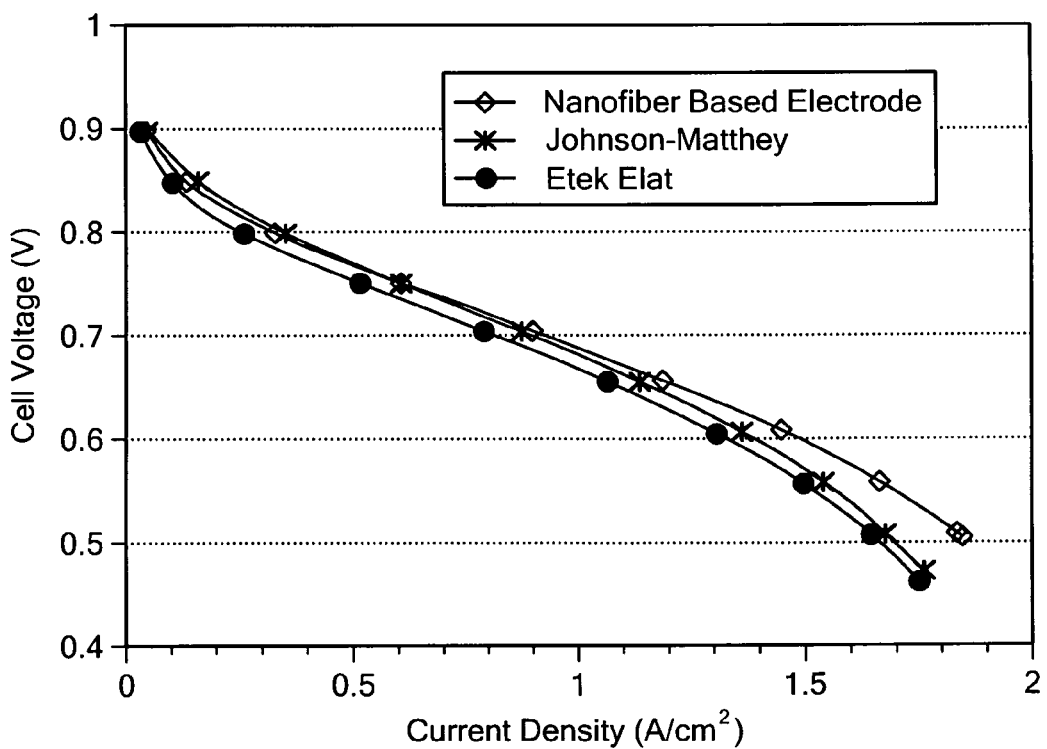
FIG. 8 is a polarization graph depicting cell voltage versus current density for a fuel cell assembly including a gas diffusion electrode of the present invention and for comparable fuel cell assemblies including conventional gas diffusion electrodes.

Referring now to FIG. 8, there is shown a polarization graph depicting cell voltage versus current density for a fuel cell assembly including a gas diffusion electrode of the present invention and for comparable fuel cell assemblies including conventional gas diffusion electrodes. As can be seen, the fuel cell assembly that included the gas diffusion electrode of the present invention exhibited about a 15% advantage in high-current-density output region, as compared to the fuel cell assemblies that included the conventional electrodes.

Figure 9:
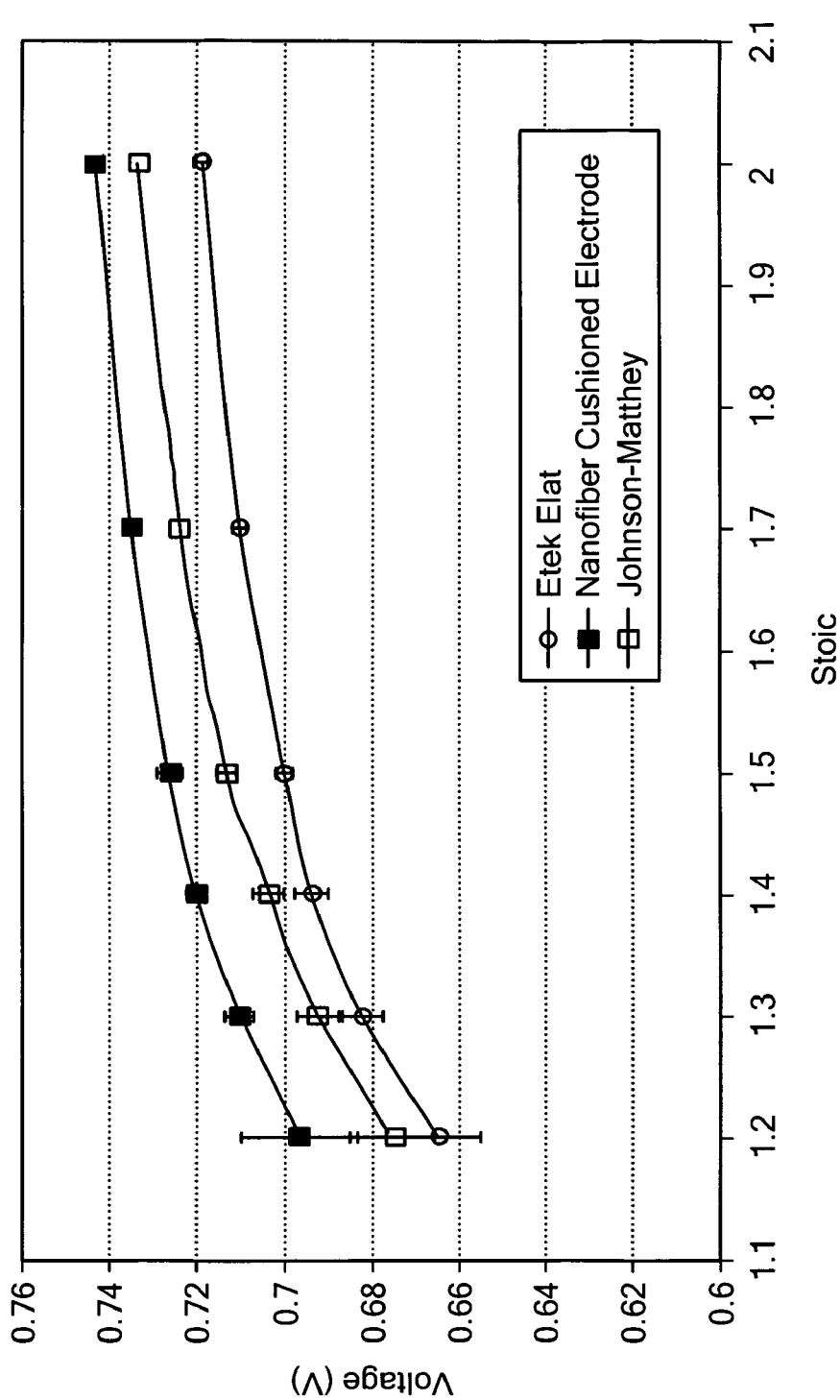
FIG. 9 is a performance chart depicting cell voltage versus $O_2$ stoichiometry in the cathode air stream for a fuel cell assembly including a gas diffusion electrode of the present invention and for comparable fuel cell assemblies including conventional gas diffusion electrodes.

Referring now to FIG. 9, there is shown a performance chart depicting cell voltage versus $O_2$ stoichiometry in the cathode air stream for a fuel cell assembly that included a gas diffusion electrode of the present invention and for comparable fuel cell assemblies including conventional gas diffusion electrodes. (The stoichiometry number is depicted as the excess multiple over that $O_2$ rate required to sustain the fuel cell discharge rate.) As can be seen, the fuel cell assembly that included the gas diffusion electrode of the present invention exhibited better performance than the fuel cells assemblies that included the conventional electrodes. More specifically, a distinctive 15-30 mV advantage was observed for low as well as high stoichiometries.

The following examples are provided for illustrative purposes only and are in no way intended to limit the scope of the present invention:

EXAMPLE 1

Gas diffusion electrodes having a cushioning layer in accordance with the present invention were fabricated using carbon paper (supplied by Toray Industries, Inc., Tokyo, JP) and PYROGRAF III® nanofibers (supplied by Applied Sciences). The carbon paper, with a thickness of ~180 μm, was used as the supporting layer of the electrode to provide mechanical support. A solvent mixture was prepared by mixing 2 L isopropyl alcohol with 1.5 L deionized water. A 1.1 kg quantity of the nanofibers was dispersed in the solvent mixture. A 1.3 L quantity of T-30 (a TEFLON® PTFE aqueous suspension with 60% solid content, supplied by DuPont) was discharged into the mixture with intensive stirring. The mixture was vigorously agitated for 30 minutes with a sonicator to form a uniform slurry.

The slurry was then applied to the surface of the supporting layer with a Meyer bar (i.e., metering rod), whose size was selected so that the finished coating had a thickness of ~20 micron. This wet sample was then transferred to a 100° C. furnace and kept isothermal for 15 min. Sintering was carried out at 350° C. for 15 min to cure the TEFLON® PTFE colloids.

Gore PriMEA® (W.L. Gore & Associates, Inc., Newark, Del.) with 50 $cm^2$ active area and 0.4 $g/cm^2$ Pt loading was used as MEA.

EXAMPLE 2

The process of Example 1 was repeated, except that a 0.5% aqueous solution Triton-X 100 (a non-ionic surfactant from DuPont) was used as diluent. A 1.1 kg quantity of the nanofibers was dispersed in the liquid and 1.3 L T-30 was discharged into the mixture with stirring.

EXAMPLE 3

The process of Example 1 was repeated except that MP1100 (a TEFLON® PTFE powder from DuPont) was used in place of T-30. A 0.8 kg quantity of MP1100 was mixed with a 1.1 kg quantity of the nanofibers and 3.5 L of the solvent mixture. Ball milling was adopted as the dispersing method, which lasted about one hour to obtain a uniform slurry.

EXAMPLE 4

The process of Example 1 was repeated except that a 0.5 kg quantity of acetylene black (supplied by Chevron Phillips Chemical Company LP) and a 0.6 kg quantity of the nanofibers were mixed with 3.5 L of 0.5% Triton-X 100 aqueous solution. A 1.3 L quantity of T-30 TEFLON® PTFE suspension was then added to the mixture under intensive stirring. Ball milling was used to disperse the solids uniformly in the slurry.

EXAMPLE 5

The process of Example 1 was repeated except that a 1.5 L quantity of ethylene glycol was mixed with 2 L water to form a solvent mixture. A 0.5 kg quantity of acetylene black and a 0.6 kg quantity of the nanofibers were mixed with the solvent. A 1.3 L quantity of T-30 TEFLON® PTFE suspension was then added to the mixture under intensive stirring. Sonication for 30 min was employed to bring the mixture to a uniform slurry.

EXAMPLE 6

A 1.1 kg quantity of nanofibers was dispersed into a 3 L quantity of 0.5% aqueous solution of Triton-X 100. A 1.6 L quantity of T-30 was discharged into the mixture with stirring. The suspension was mixed well for 30 min with a sonifier to form a uniform slurry. Using a doctor blade knife (i.e., metered knife), the slurry was coated onto a surface of carbon paper to form a cushioning layer with the thickness of c.a. 50 micron. Immediately after coating, the electrode was passed through a calendering device with two parallel cylindrical rollers. The gap between the two rollers was controlled so that a compression of 20% was achieved during calendering. After the calendering process, the electrode was dried at 80° C. followed by a sintering step at 360° C. for 30 min.

EXAMPLE 7

The process of Example 6 was repeated except that the calendering process was conducted after the drying process.

Three passes were employed. Additionally, the calendering device was spring loaded with constant tension instead of constant gap.

EXAMPLE 8

The process of Example 7 was repeated, except that an additional porous layer was applied after drying the first cushioning layer. A 1.1. kg quantity of acetylene black was mixed with a 1.5 L quantity of isopropyl alcohol and a 2 L quantity of deionized water. The mixture was then sonicated for 30 min. The slurry was then coated onto the already formed cushioning layer by a Meyer rod. Similar drying and sintering processes to those described above were conducted following the coating process.

EXAMPLE 9

A phase inversion process was used in this example to demonstrate another method to fabricate the porous cushioning layer. A 0.2 kg quantity of polyvinyldene fluoride powder (PVDF, supplied by Polysciences) was dissolved in a 2 L quantity of N,N-dimethylacetamide by stirring and moderate heating. A 0.6 kg quantity of acetylene black and a 0.5 kg quantity of nanofibers were added to the PVDF solution. The mixture was sonicated for 30 min to form a uniform slurry. The slurry was coated onto a surface of the carbon paper with a Meyer rod to create a surface with a thickness of c.a. 50 micron. The electrode was then submerged in a coagulation bath containing deionized water. The residue solvent and excessive water was evaporated at 120° C. for 15 min followed by a sintering process at 360° C. for 15 min.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A gas diffusion electrode suitable for use with a solid polymer electrolyte membrane, said gas diffusion electrode comprising:
   (a) a supporting layer, said supporting layer being an electrically-conductive, porous structure, wherein said supporting layer is carbon fiber paper;
   (b) a first cushioning layer, said first cushioning layer having a thickness of about 1 to 100 microns and being an electrically-conductive, porous structure consisting of a nonwoven mat of electrically-conductive fibers bound together with a first polymeric binder, wherein said electrically-conductive fibers are carbon nanofibers; and
   (c) a second cushioning layer, said second cushioning layer consisting of electrically-conductive particles and a second polymeric binder, said electrically-conductive particles consisting of carbon black;
   (d) wherein said first cushioning layer is positioned between said supporting layer and said second cushioning layer and is in direct contact with both said supporting layer and said second cushioning layer.

2. The gas diffusion electrode as claimed in claim 1 wherein said carbon nanofibers have a diameter less than about 200 nm.

3. The gas diffusion electrode as claimed in claim 1 wherein said carbon nanofibers have a length of about 0.1 to 100 microns.

4. The gas diffusion electrode as claimed in claim 3 wherein said carbon nanofibers have a length of about 30 to 100 microns.

5. The gas diffusion electrode as claimed in claim 1 wherein said first cushioning layer has a pore size of about 0.01 to 50 microns.

6. The gas diffusion electrode as claimed in claim 1 wherein said first polymeric binder and said second polymeric binder are selected from the group consisting of perfluorinated polymers, sulfonated perfluorinated polymers, polyolefins, polyether ketones, polyether sulfones, polysulfones, polybenzimidazoles, polyphenylene sulfides, polyimide, polyamide, polyphenylene oxide, and the ionic equivalents thereof.

7. The gas diffusion electrode as claimed in claim 6 wherein each of said first polymeric binder and said second polymeric binder is polytetrafluoroethylene.

8. The gas diffusion electrode as claimed in claim 1 further comprising a third cushioning layer, said third cushioning layer being an electrically-conductive, porous structure coupled to said supporting layer, said supporting layer being positioned between said first cushioning layer and said third cushioning layer.

9. The gas diffusion electrode as claimed in claim 8 further comprising a fourth cushioning layer, said fourth cushioning layer being an electrically-conductive, porous structure coupled to said supporting layer, said third cushioning layer being positioned between said supporting layer and said fourth cushioning layer.

10. A membrane electrode assembly comprising
   (a) a solid polymer electrolyte membrane having a pair of opposing surfaces;
   (b) a pair of gas diffusion electrodes of the type claimed in claim 1, one of said pair of gas diffusion electrodes being secured to one of the opposing surfaces of the solid polymer electrolyte membrane, the other of said pair of gas diffusion electrodes being secured to the other of the opposing surfaces of the solid polymer electrolyte membrane, the respective first cushioning layers of said pair of gas diffusion electrodes facing towards the solid polymer electrolyte membrane and the respective supporting layers of said pair of gas diffusion electrodes facing away from the solid polymer electrolyte membrane.

11. The gas diffusion electrode as claimed in claim 1 wherein said first polymeric binder is a mixture of polymeric binders.

12. A gas diffusion electrode suitable for use with a solid polymer electrolyte membrane, said gas diffusion electrode comprising
   (a) a supporting layer, said supporting layer being an electrically-conductive, porous structure, wherein said supporting layer is carbon fiber paper;
   (b) a first cushioning layer, said first cushioning layer having a thickness of about 1 to 100 microns and being an electrically-conductive, porous structure consisting of a nonwoven mat of electrically-conductive fibers bound together with a first polymeric binder, wherein said electrically-conductive fibers are carbon nanofibers;
   (c) a second cushioning layer, said second cushioning aver consisting of electrically-conductive particles and a second polymeric binder, said electrically-conductive particles consisting of carbon black;
   (d) wherein said first cushioning layer is positioned between said supporting layer and said second cushioning layer and is in direct contact with both said supporting layer and said second cushioning layer; and (e) a catalyst layer coupled to said supporting layer, wherein said first cushioning layer and said second cushioning layer are positioned between said supporting layer and said catalyst layer.

13. The gas diffusion electrode as claimed in claim 12 wherein said catalyst layer comprises catalyst nanoparticles bound together with a polymeric binder.

14. The gas diffusion electrode as claimed in claim 12 wherein said catalyst layer comprises catalyst nanoparticles deposited on electrically-conductive particles or fibers that are bound together with a polymeric binder.

15. A gas diffusion electrode suitable for use with a solid polymer electrolyte membrane, said gas diffusion electrode being made by a method comprising the steps of:
 (a) providing a supporting layer, said supporting layer being an electrically-conductive, porous structure having an exposed surface, wherein said supporting layer is carbon fiber paper;
 (b) mixing fibers with at least one diluent and at least one polymeric binder to form a first suspension of generally uniform composition, wherein all of the fibers of said first suspension consist of carbon nanofibers;
 (c) depositing the first suspension on the exposed surface of the supporting layer to form a first coating;
 (d) drying the first coating;
 (e) then, depositing onto said first coating a second suspension of generally uniform composition to form a second coating, said second suspension consisting of carbon black, at least one diluent and at least one polymeric binder;
 (f) then, drying said second coating;
 (g) then, simultaneously sintering said first coating and said second coating, wherein each of said first coating and said second coating has a thickness of about 1 to 100 microns; and
 (h) then, forming a catalyst layer on the exposed surface of said second coating.

* * * * *